(No Model.) 2 Sheets—Sheet 1.

F. J. LANCASTER.
COIN CONTROLLED WEIGHING MACHINE.

No. 402,748. Patented May 7, 1889.

Witnesses:
O. L. Sundgren
Joseph W. Roe

Inventor.
Frederick J. Lancaster
by attorneys
Brown & Hall

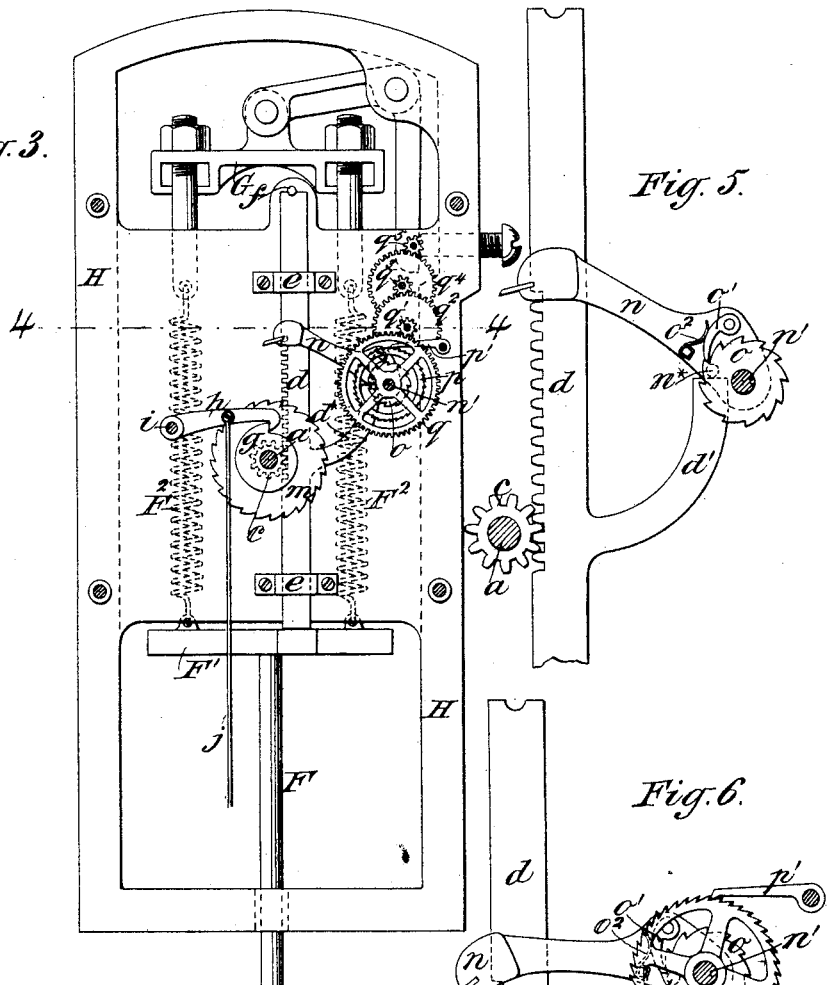

UNITED STATES PATENT OFFICE.

FREDERICK J. LANCASTER, OF NEW YORK, N. Y., ASSIGNOR TO THE NATIONAL WEIGHING MACHINE COMPANY, OF SAME PLACE.

COIN-CONTROLLED WEIGHING-MACHINE.

SPECIFICATION forming part of Letters Patent No. 402,748, dated May 7, 1889.

Application filed May 28, 1888. Serial No. 275,300. (No model.)

*To all whom it may concern:*

Be it known that I, FREDERICK J. LANCASTER, of the city and county of New York, in the State of New York, have invented a new and useful Improvement in Coin-Controlled Weighing-Machines, of which the following is a specification.

This invention relates to that class of weighing-machines in which the weighing and indicating are only permitted on the deposit of a coin therein.

The improvement consists in certain combinations, hereinafter described and claimed, for the purpose of more effectually preventing the weighing of more than one person or load after the deposit of one coin in the machine and before the deposit of another coin therein.

Figure 2:
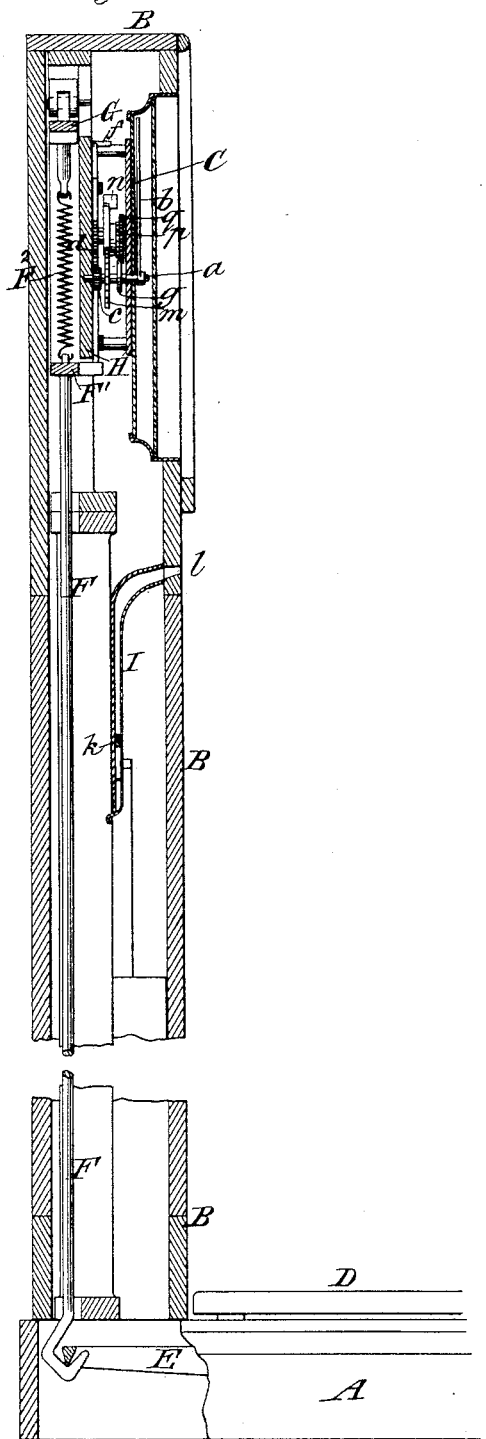
Figure 1:
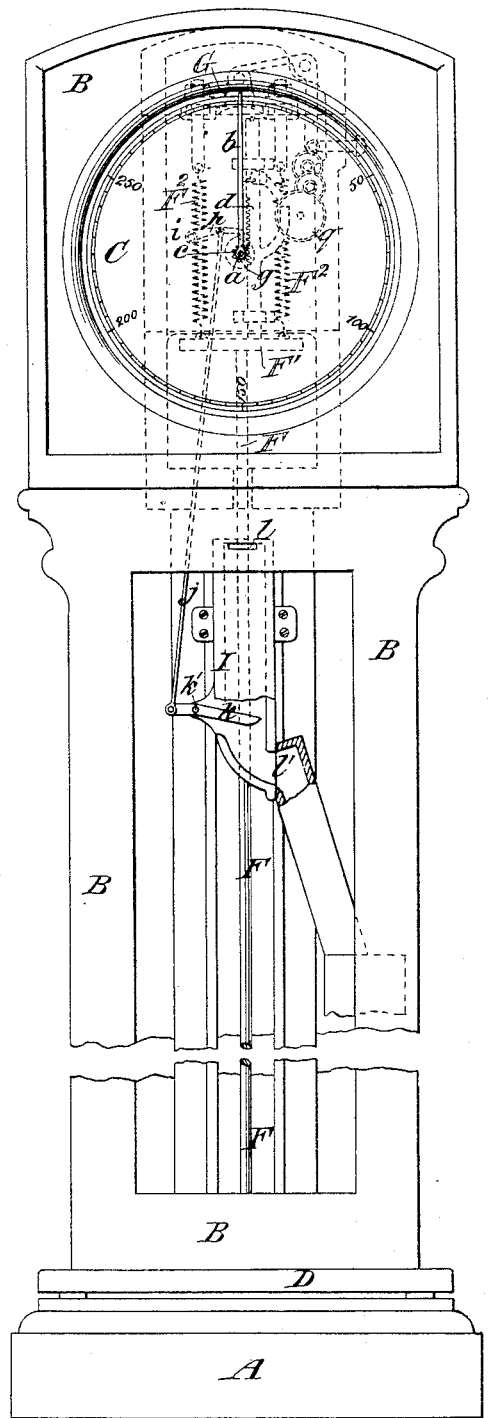

Figure 1 in the accompanying drawings is a front view of a weighing-machine embodying my invention, having part of the front of the casing removed to expose the interior to view. Fig. 2 represents an elevation at right angles to Fig. 1, mostly in section. Fig. 3 is a front view, on a larger scale, of that part of the machine in which my invention particularly consists. Fig. 4 represents a horizontal section taken in the line 4 4 of Fig. 3; and Figs. 5 and 6 are front views of some of the details, on a larger scale than Fig. 3, in which the same parts appear.

The same letters of reference designate the same or corresponding parts in all the figures.

A designates the base of the machine, on which is supported the casing B, in the upper part of which is the dial C and the indicating mechanism.

D is the platform, E the lever on which it operates, and F the rod connected with said lever E and passing upward through the casing B, and having at its upper end a cross-head, F', with which are connected the lower ends of the counterbalancing-springs F², the upper ends of which are connected with a support, G, in the usual or any suitable manner.

All of the parts above described are or may be the same as in scales in common use, except that there is no direct connection between the index-arbor $a$ and the rod F and its cross-head F', and consequently no direct connection between the index and the platform or part of the machine which receives the load to be weighed.

The index-arbor $a$, carrying the index $b$, is furnished with a pinion, $c$, gearing with a straight toothed rack, $d$, which works in suitable fixed guides, $e$, but which is disconnected from the rod F and cross-head F', and which, when the scale is at rest without a load upon the platform, rests on the top of the said cross-head and rod, and is held by the said cross-head and rod, with its upper end against a fixed stop, $f$, secured in the frame H, which contains the bearings for the index-arbor $a$, and to which are also attached the rack-guides $e$, and which also supports all the parts of the indicating mechanism.

When the rack is held up against the stop $f$, as hereinabove described, and represented in Figs. 1 and 3, the rack $d$, by its action on the pinion $c$, holds the index at zero. When a person gets on the platform and depresses the rod F and cross-head F', the rack $d$ is left free to descend by its own weight, which is sufficient to cause it to turn the pinion $c$ and the index. The rod F and cross-head F' are carried down to a level, depending upon the weight of the person on the platform, and the rack $d$, following the said rod and cross-head and turning the pinion $c$, causes the weight to be indicated. When the person gets off the platform and the rod F and cross-head F' are allowed to rise, they raise the rack again to the stop $f$ and bring the index to zero. It will thus be seen that the cross-head serves as a stop to stop the rack and the index at the proper point to indicate the weight and to lift the rack again to return the index to zero.

In order to prevent the descent of the rack $d$ and prevent any indication of the weight until a coin has been placed in the machine, there is secured on the index-arbor $a$ a stop-wheel, $g$, having a single tooth for engagement with a pawl, $h$, which is pivoted by a pin, $i$, to the frame H. This pawl is connected by a rod, $j$, with a movable coin-intercepting device, consisting of a lever, $k$, which is pivoted at $k'$ to the coin-duct I. The rod $j$ connects with the shorter arm of this lever, the longer arm of which enters the coin-duct in such manner as to be capable of intercepting the passage of a coin therethrough, and is held up in a position to so intercept the coin by the weight of its shorter arm and the rod $j$ and pawl $h$, thereto connected, while the pawl $h$ holds the stop-wheel $g$ and the index locked.

The coin, being inserted into the duct at $l$ and falling on the longer arm of the lever $k$ within the duct, overcomes the weight of the other arm of the said lever and that of the rod $j$ and the pawl $h$ and lifts the pawl, and so sets free the index, so that the rack, descending by its own weight, will turn the index as far as permitted by the rod F and cross-head F', to which the rack falls. In this operation the longer arm of the lever $k$ falls to a position to allow the coin to pass out through an opening, $l'$, at the lower end of the coin-duct and outward to any secure and suitable receptacle.

I will now proceed to describe the means by which, in connection with the separation of the rack from the bar F, the weighing of two or more persons on the deposit of a single coin is prevented. The index-arbor $a$ has fast upon it a ratchet-wheel, $m$, which is capable of being engaged by a pawl, $n$, which turns loosely upon an arbor, $n'$, arranged in bearings in the frame H. The object of this pawl $n$ and ratchet-wheel $m$ is to stop the rotation of the index at the point to indicate the weight—that is to say, at the point where it has been arrested by the stoppage of the descent of the rack $d$. The pawl $n$ should be of considerable weight. When the platform is without a load, the pawl $n$ is supported out of engagement with the ratchet-wheel $m$, and with its tooth at a considerable distance above the said wheel, as shown in Fig. 3, by means of a support consisting of an arm, $d'$, on the back of the rack $d$, which is under a pin or projection, $n^*$, on the said pawl. The rack and pawl are shown in this condition in Figs. 3 and 5; but the ratchet-wheel $m$ is not shown in the latter figure. The said arbor $n'$ has upon it, rigidly mounted and firmly secured together, a small ratchet-wheel, $o$, a larger ratchet-wheel, $p$, (see Fig. 6,) and a spur-toothed wheel, $q$, which is shown in Fig. 3, but omitted from Fig. 6. The last-mentioned wheel has geared with it a train of gearing, $q'$ $q^2$ $q^3$ $q^4$ $q^5$, (see Fig. 3,) the purpose of which is to act by the friction of its parts to retard the rotary motion of the said wheel $q$. The pawl $n$ has pivoted to it a smaller pawl, $o'$, which is held in engagement with the ratchet-wheel $o$, as best shown in Fig. 5, by a light spring, $o^2$, the teeth of the said ratchet-wheel being so set that the pawl cannot fall without producing the rotation of the said ratchet-wheel $o$. The ratchet-wheel $p$ has its teeth set in the same direction as those of the ratchet-wheel $o$, and the stop-pawl $p'$, pivoted to the frame H, engages with the teeth of the said wheel $p$. When the rod F is depressed by the load on the platform, and the rack $d$ is thus left free to descend and turn the index-arbor $a$, the ratchet-wheel $m$ turns with the said arbor. At the same time the arm $d'$ on the back of the rack $d$, being withdrawn from under the projection $n^*$ on the pawl $n$, allows the said pawl to descend; but this descent is comparatively slow, being retarded by the friction of the train of gearing $q$ $q'$ $q^2$ $q^3$ $q^4$ $q^5$, of which the first wheel, $q$, is fast to the ratchet-wheel $o$, with which the little pawl $o'$ on the pawl $n$ engages. This retardation of the descent of the pawl $n$ gives time for the vibration of the springs $F^2$ and the platform to cease and the index to steady itself at the proper point on the dial before the index is locked by the pawl $n$ falling into engagement with the ratchet-wheel $m$, as shown in Fig. 6. The index remains thus locked by the pawl $n$ and ratchet-wheel $m$ until the load is removed, and then as the rack $d$ rises with the rod F the arm $d'$ on the rack, coming in contact with the projection $n^*$ on the pawl $n$, raises the pawl and liberates the index, so that the index may return as quickly as the platform can. This quick return of the pawl $n$ is not at all interfered with by the train of gearing $q$ $q'$ $q^2$ $q^3$ $q^4$ $q^5$, because while the ratchet-wheel $p$ is prevented from turning by the pawl $p'$, the smaller pawl, $o'$, attached to the pawl $n$, is free to pass back with no material obstruction over the teeth of the ratchet-wheel $o$, which is fast to the ratchet-wheel $p$.

After the index has been locked, as above described, by the pawl $n$ falling into engagement with the ratchet-wheel $m$, the further movement of the index is prevented, notwithstanding additional load may be placed upon the platform, and hence the weight of the additional load cannot be indicated. When the person or load gets off or is removed from the platform, the upward movement of the rack is produced so quickly by the extremely-lively action of the counterbalance-springs that there is not time for another person to get on the platform before the index returns to zero and the scale has been locked again by the pawl $h$ dropping behind the tooth of the stop $g$ on the index-spindle. During this upward movement the support $d'$ on the rack $d$ lifts the pawl $n$ again to the position shown in Figs. 3 and 5, ready for the next weighing operation, without any material obstruction being offered by the retarding device to the rapidity of the said upward movement.

What I claim as my invention, and desire to secure by Letters Patent, is—

1. The combination, with the index-spindle $a$ and the pinion $c$ and ratchet-wheel $m$ on the said spindle, of the pawl $n$, for engaging with said ratchet-wheel, the rack $d$, disconnected from the platform or part of the machine which receives the load and gearing with said pinion $a$, and the pawl-support $d'$, attached to said rack $d$, all substantially as herein described.

2. The combination, with the index-spindle and the ratchet-wheel $m$ thereon, the pawl $n$, for engaging with said ratchet-wheel, and the arbor $n'$, on which said pawl works, of the ratchet-wheels $o$ and $p$ and wheel $q$ on said arbor, the pawls $o'$ and $p'$, engaging with said ratchet-wheels, and the train of gearing actuated by said wheel $q$, all substantially as herein described, whereby the descent of the said pawl $n$ is retarded, but its ascent is left free from retardation, substantially as and for the purpose herein described.

FRED. J. LANCASTER.

Witnesses:
FREDK. HAYNES,
JOS. W. ROI.